Oct. 16, 1934.   E. LOMBARD   1,976,951
SUSPENSION OF VEHICLES
Filed Dec. 5, 1932   3 Sheets-Sheet 1

Inventor;
Edmond Lombard
per Fred F. Bacon
Attorney

Oct. 16, 1934.  E. LOMBARD  1,976,951
SUSPENSION OF VEHICLES
Filed Dec. 5, 1932    3 Sheets-Sheet 2

Inventor:
Edmond Lombard
per Fred F. Barton
Attorney.

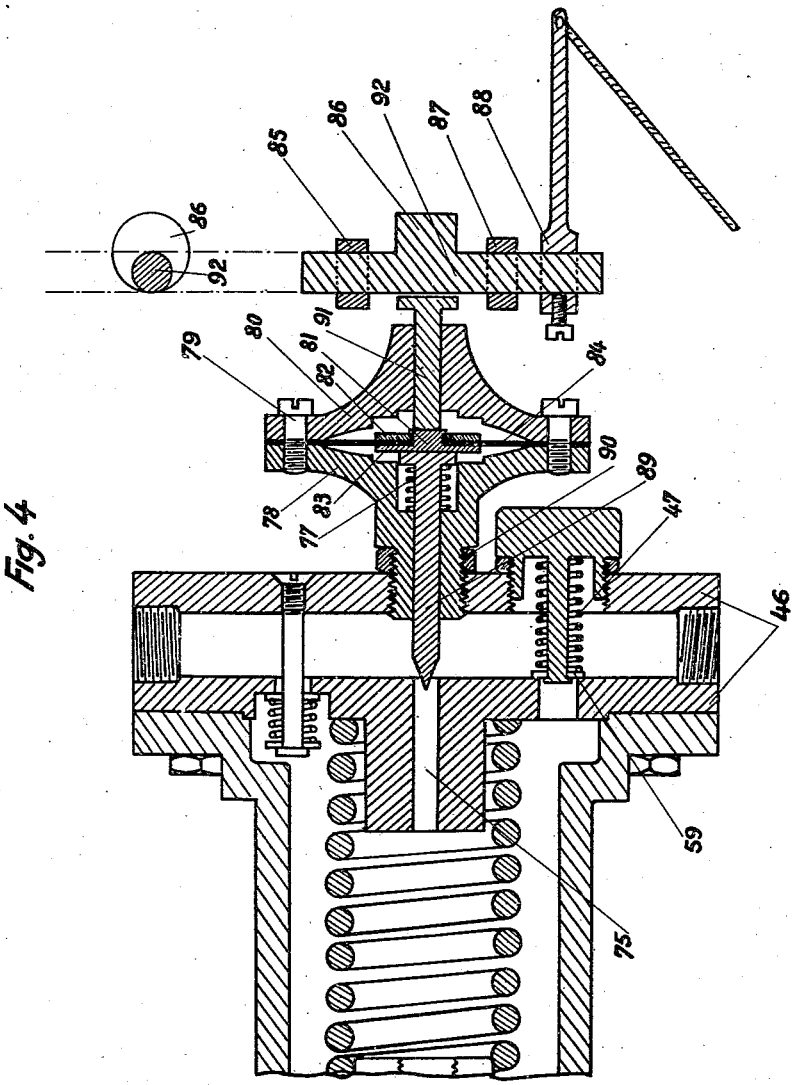

Patented Oct. 16, 1934

1,976,951

UNITED STATES PATENT OFFICE 1,976,951

SUSPENSION OF VEHICLES

Edmond Lombard, Dizy, France

Application December 5, 1932, Serial No. 645,777
In France December 19, 1931

4 Claims. (Cl. 280—104)

The present invention relates to a suspension stabilizer compensator for automobiles or other vehicles whereby the compression forces exercised on the fluid element of one or more dampers coupled for compensation in pairs or fours are adapted to be made more or less united in order to obtain a perfect suspension and an automatic and certain means of stabilization.

The oil dampers or shock absorbers at present employed have more particularly for their purpose to damp either in one direction or in both directions, the elasticity of the suspension springs. They work independently one from the other and each acts on its own account to damp only the spring with which it works.

There is thus produced indeed a damping effect on the chassis but as there is no compensation between the shock absorbers, the vehicle tends to lie on the side, for example during turning or over-extensions however small they are, in motion.

The present invention remedies these grave difficulties by avoiding during pitching or in all other cases the rapid flexure or extension of the springs by compensating this flexure or this extension of the spring or springs in question by a substantially equal flexure or extension, delayed, damped, or not, of one or other of the opposite springs.

The invention contemplates further in combination with the compensator-stabilizers, expansion chambers provided with automatic and adjustable compensator-regulators destined to damp, regulate and delay the effects of the compensation. These regulators may be controlled from the dashboard of the vehicle in order to permit regulation of the compensation effects, during operation.

The attached drawings show by way of example different embodiments of the invention, according to which:—

Fig. 4 represents a section of the optional non-fluid control, which can be actuated from the distance by means of a cable, a Bowden control or a control by means of rods and mounted on the regulators.

Figure 1:
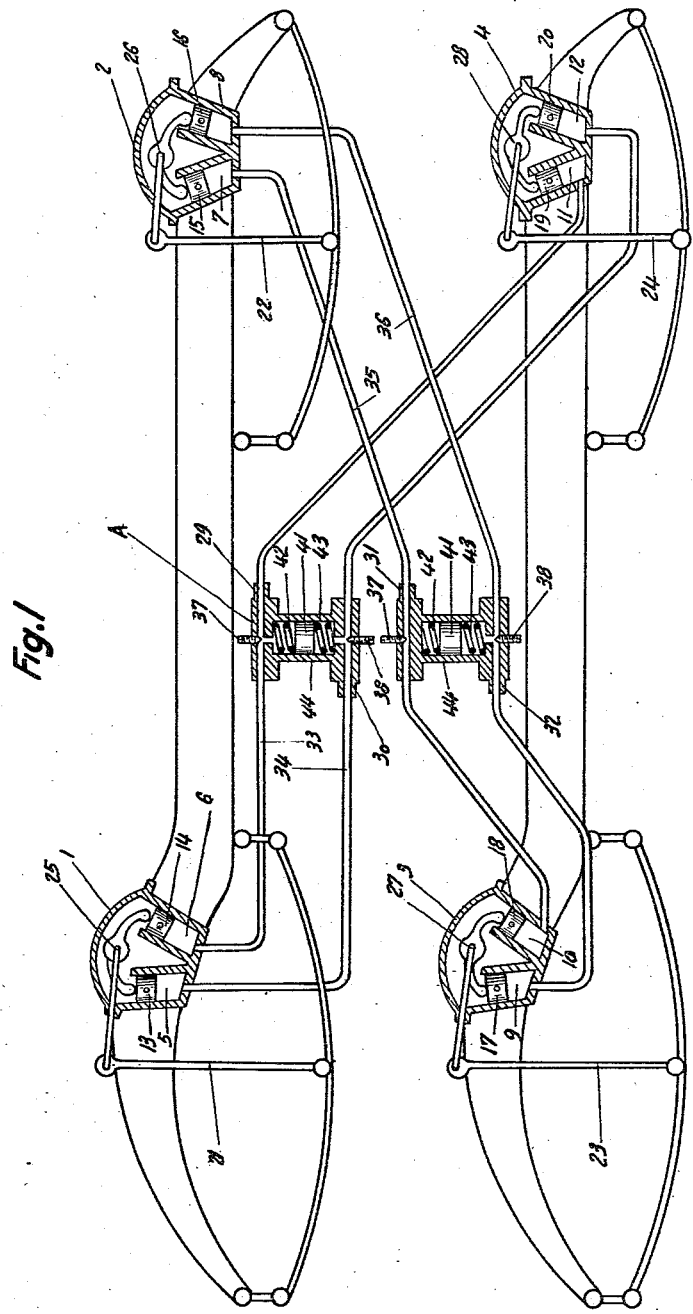
Fig. 1 is a diagrammatic view of the stabilizer-compensator system with the regulators, applied to an automobile vehicle.

According to Fig. 1 and by way of example, the dampers 1, 2, 3 and 4 mounted on and fixed to the chassis longitudinals are each constituted by two attached compression cylinders 5 and 6, 7 and 8, 9 and 10, 11 and 12, communicating at their upper parts and forming a liquid reservoir. Pistons 13 and 14, 15 and 16, 17 and 18, 19 and 20 can be displaced in these cylinders, said pistons being connected by compound levers 25, 26, 27 and 28 to the rods 21, 22, 23, 24 coupled to the front and rear axles.

These pistons are packed with segments and provided with any kind of a valve such as a clack or ball valve permitting the automatic charging of the system. They may also be provided with a cup leather so arranged as to be fluid-tight upon compression while permitting a sufficient filling of the system at the suction stroke.

The dampers employed may, however, be of any suitable kind.

In the embodiment of Fig. 1 the compensator-regulators A and B (Fig. 2) are constituted by a cylinder 44 closed at each end by the cheeks or end plates 45 and 46 communicating by the tubes 33 and 34 (Fig. 1) with the dampers 1 and 4 (Fig. 1) coupled for compensation.

In said cylinder 44 there can slide the piston 41 balanced at the centre by antagonistic springs 42 and 43 and of which the stroke regulated to requirements, permits a certain displacement of the liquid in one direction or the other from or towards the dampers 1 and 4 by the intermediary of the tubes 33 and 34.

The piston 41 of the compensator-regulator A is provided either with two cup leathers 63 and 64 secured by screws 39 and 40 or, again, with packing segments, in such a way as to ensure its fluid tightness.

The stroke of this piston 41 is limited either by the depression of the springs 42 and 43 or by any other means in order that the maximum volume of the liquid displaced corresponds to a predetermined proportion of the volume of the liquid adapted to be displaced by one of the pistons of the dampers. In this way, the compensation between the opposed dampers 1 and 4 is itself damped, delayed, increased or reduced as required, according to the kind of the vehicle while allowing the springs the flexibility necessary for the comfort of the travellers.

The valves 49 and 50 (Fig. 2) placed in the end plates of the regulator A are simply balanced by the springs 61 and 62 in such a way as to permit the entry of the liquid without resistance into the regulator cylinder, but the safety valves 59 and 60 provided with suitable springs 47 and 48 only permit the outlet of liquid in the case of an abnormal or sudden shock.

The points 37 and 38 with adjusting screws, also placed in the cheeks of the regulator A, permit the entry of liquid into the regulator cylinder to be damped more or less. They also permit the outflow to be regulated. They have for their object to regulate as required the flexibility of the suspension as well as to amplify, reduce, accelerate or retard, the effects of compensation. The tightness of the screwed pins is ensured by the nuts 53 and 56 and the blind counter nuts 51—57 provided with packings 52, 54, 55 and 58.

The second regulator B is identical with regulator A, and it communicates with the dampers 2 and 3 by the intermediary of tubes 35 and 36 (Fig. 1).

Figure 2:
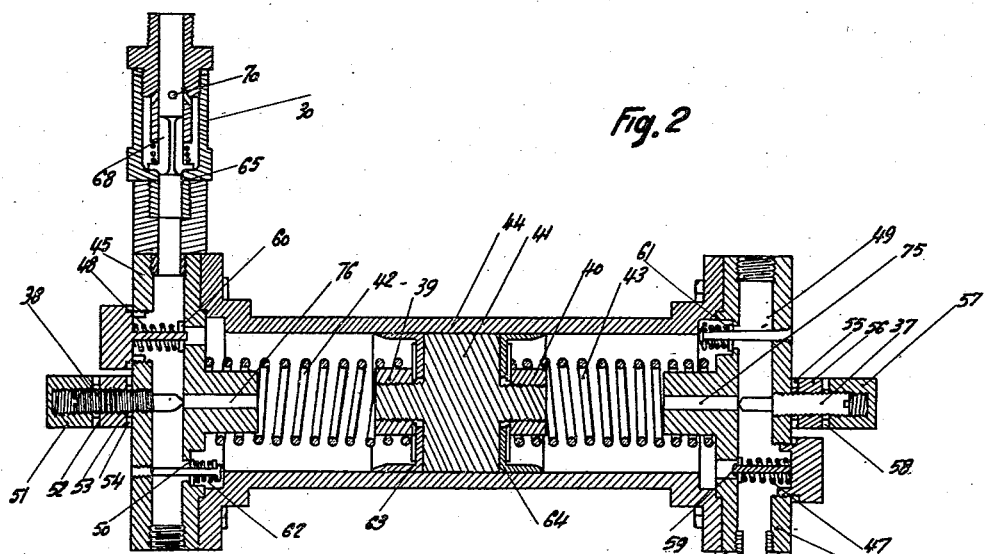
Fig. 2 is a section of one type of regulator provided with two one-way damping valves.

According to Figs. 1 and 2 the valves 29, 30, 31 and 32 with a one-way braking effect are of the straight type. They can also be of any other type.

The valve 29 for example (Fig. 2) is constituted by a clack valve 68 balanced by a spring 69 which maintains it pressed against its seat 65.

This valve is pierced with a hole 71, calibrated according to requirements.

This valve has for its object to damp more rapidly the circulation of the fluid in one direction; for example according to Figs. 1 and 2 in the direction of piston 19 of the damper 4 working at compression and forcing the liquid through the tube 33 towards the compensator-regulator A, that is to say when the spring is allowed to extend. In effect the liquid arriving by the tube 33 of the cylinder 11, of which the piston 19 works at compression, maintains the valve 68 pressed against its seat 65 and only flows slowly through the calibrated orifice 71 thus producing a more powerful damping of the extension of the spring in question.

On the contrary, this valve permits the free passage of the liquid in the other direction without destroying in any way the effects of the compensation when, for example, the piston 14 working at compression forces the liquid contained in the cylinder 6 of the damper 1 through the tube 33 into the cylinder 11, under the piston 19 of the damper 4. In this case the valve 68 rises from its seat and the liquid runs out through the orifices 70 into the passage in the union 66, the fluid tightness of which is ensured by the ring 67.

Figure 3:
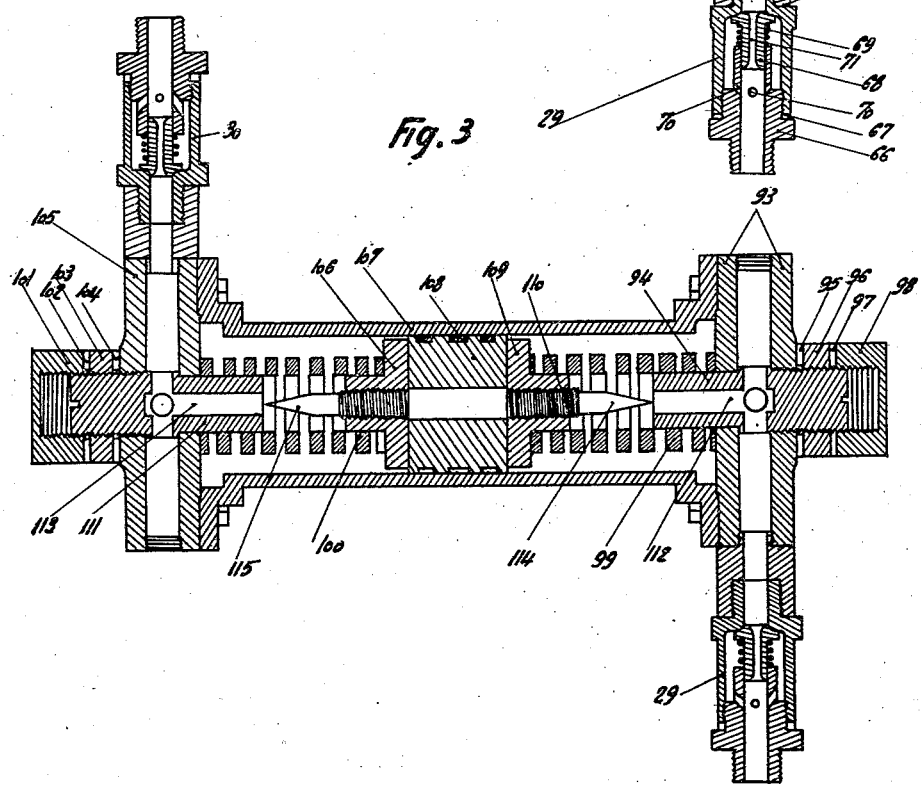
Fig. 3 represents a transverse section of another kind of regulator provided with two one-way damping valves.

Fig. 3 represents another form of compensator-regulator of more simple construction.

It is constituted by a cylinder 107 closed at each end by the end plates 93 and 105 communicating either with the dampers 1 and 4 by the tubes 33 and 34 or with the dampers 2 and 3 by the tubes 35 and 36.

In the cylinder 107 there is adapted to move a piston 108 balanced at the centre by antagonistic springs 99 and 100 of which the stroke regulated as desired, permits a certain displacement of the liquid in one direction or the other.

The piston 108 is provided either as in Fig. 2 with packing segments or with two cup leathers, in such a way as to ensure its fluid tightness.

The stroke of the piston 108 is limited by the depression of the springs 99 and 100 or by an abutment in order to limit the volume of liquid displaced, as in the case of the compensator-regulator A of Fig. 2.

The piston 108 is provided with a rod 110 fixed by means of the lateral screws 106 and 109 and of which the extremities 114 and 115 form points.

The sleeves 94 and 111 placed in the end plates 93 and 105 put the cylinder in communication with the tubes by the calibrated orifices 112 and 113. The points of the rod 110 may approach to and separate from these portions. Fluid tightness is assured by means of the jointing members 95, 97, 102, 104, the nuts 96 and 103 and the blind counter nuts 98 and 101.

Assuming, according to Fig. 3, that the liquid displaced by one damper passes into the cylinder, for example, by the calibrated orifice 112 and displaces the piston 108 towards the other extremity of the cylinder; it is obvious that the liquid contained in this second part of the cylinder will leave the latter through the calibrated orifice 113 for producing the regulator effect desired as in the case of the regulator A of Fig. 2. But corresponding to the displacement of the piston 108 in the direction referred to, the point 115 will close the orifice 113 progressively, thus producing a progressive and automatic damping. This damping will be more or less powerful according as the portions 94 and 111 are brought towards or separated from the points 114 and 115. The effects of the compensation may thus be damped, reduced and regulated to requirements.

According to Fig. 1 and taking account of the above description, it is easy to see that if the whole system is filled with a liquid such as oil, glycerine or the like, there is a resilient connection of the whole assembly and the effects produced on the spring or springs (flexure or extension) by being transmitted to one or other of the pistons of the dampers by the intermediary of their compound rods and levers, are automatically transmitted to the corresponding dampers in the correct direction to maintain the perfect stability of the vehicle.

Assuming, for example, during a turn to the left at high speed that the pistons 18 and 20 (Fig. 1) during the depression of the corresponding springs, compress the liquid in the cylinders 10 and 12, and the liquid will be moved by the tubes 34 and 35 into the cylinders 5 and 7 below the pistons 13 and 15 of the dampers 1 and 2 placed on the opposite side, where the compensation of the efforts and the maintaining of the chassis in a normal position is secured, the stretching of the springs on the left becoming practically impossible.

Assuming on the other hand after the passage of the rear wheels over a channel, the corresponding springs react, the pistons 13 and 17 actuated by the intermediary of the rods 21 and 23 and the compound levers 25 and 27 compress the liquid contained in the respective cylinders 5 and 9 of the dampers 1 and 3, the liquid will be forced into the tubes 34 and 30, will pass through the calibrated orifices of the damping valves 30 and 32 for entering the cylinders 12 and 8 under the pistons 20 and 16. The depression of the front springs will be prevented at the same time that the reaction of the rear springs will be considerably braked and the stability of the vehicle maintained.

The system being reversible, it is evident that the same results are obtained from left to right, from right to left, from front to rear and from rear to front, that it relates to the flexure or stretch of the springs, the stretch being, on increase, damped by means of the calibrated orifices of one-way damping valves.

The efforts of compensation and the damping efforts are more or less delayed, more or less damped or more or less reduced by means of the regulator cylinders A and B which have also for their effect, to prevent hammer effects.

In fact, according to Fig. 1, assuming for example that the piston 14 during the compression of the corresponding spring, compresses the liquid contained in the cylinder 6 (damper 1), this liquid will be forced through the tube 33 towards the regulator A and below the piston 19 of the cylinder 11 of the damper 4. If the resistance is too great a part of the liquid will penetrate into the cylinder 44 of the regulator A through the orifice regulated by means of the point 37, will displace the piston 41 which in turn will force the liquid in the other part of the cylinder 44 through the orifice regulated by the point 38 and will feed through the tube 34 into the cylinder 5 of which the piston 13 works at suction.

The volume of liquid adapted to be displaced by means of the regulator A being a function of the stroke of the piston 41 and this course being regulated to requirements according to the type of damper, the compensation between the damper 1 and the damper 4 is thus adjustable.

Further, it is possible to diminish or increase the damping effects of the regulator A by screwing or unscrewing the pointed screws 37 and 38.

On the other hand these points may be replaced by the non-fluid remote control of Fig. 4. This arrangement is mounted on the end plates of the compensator-regulators instead of and in the place of the adjustable screw points. It is constituted by two circular cheeks 78 and 80 between which there is clamped by means of bolts 79 a flexible diaphragm 84 of leather, thin metal or other appropriate material. This diaphragm is provided at the centre with two metallic rings 82 and 83 assembled by means of a rivet 81. The cheek 78 is pierced at the centre with a circular hole in which a rod 89 can move, pressing at one end against the ring 83 by means of the spring 77 and terminated by a point at the other extremity. A joint member 90 ensures the fluid tightness of the cheek 78.

The cheek 80 is itself also pierced at the centre with a round hole in which a rod 91 moves. This rod serves to transmit the axial movement produced by the rotation of the cam 86 mounted on the shaft 92. The shaft 92 is supported by means of the bearings 85 and 87 and is actuated by a lever 88 of suitable length. The extremity of the lever 88 is connected to a cable, a Bowden control or a rod which is controlled from the dashboard of the vehicle by suitable means.

It is obvious that the rotation of the cam 86 produces the displacement of the rod 91 which transmits it to the pointed rod 89 by means of the rings 82—83 and the diaphragm 84.

If it proves necessary to move the cam back, the system is displaced in the inverse direction under the action of the spring 77 which maintains the rod 91 pressed constantly against the cam 86.

The point of the rod 89 closes the calibrated orifice 75 more or less producing the same regulation as that which is obtained by means of the pointed screws 37 and 38 of the compensator-regulators as described above with regard to Fig. 2.

It thus results that one can regulate either when stationary or in motion and from the dashboard of the vehicle, the flexibility of the springs and the effects of the compensation of the efforts, either on flexure or on unbending of the springs, in such a way that the stability of the vehicle is perfect while maintaining the comfort of the travellers and that as the vehicle never leaves the ground, the driver remains in every case in control of its direction and it becomes responsive to control and sweet in action.

The above arrangements may be applied to an arrangement without blade springs, by giving suitable dimensions to the dampers and by providing coil springs on their pistons. Further one can also introduce springs of any form between the dampers and the axles, or connect the springs to the axles by means of blade springs.

What I claim and desire to secure by Letters Patent of the United States of America is:—

1. A vehicle suspension system for a vehicle having a pair of front and a pair of rear wheels supported by springs, a damper associated with each wheel, each damper including two pistons one serving to displace liquid on flexure of the spring and the other on extension of the spring, a pair of liquid transmission means between each pair of diagonally opposite dampers, said transmission means extending from the cylinder of each damper in which the piston would force out the liquid on flexure of the spring, to the cylinder of the diagonally opposite damper of which the piston would force out the liquid on extension of the spring and regulating means between each pair of said fluid transmission means to regulate the compensation of each opposite pair of dampers.

2. A vehicle suspension system as claimed in claim 1 and wherein said regulating means is provided for each pair of liquid transmission means between diagonally opposite pairs of dampers; said regulating means including a cylinder and a piston, liquid pressure being applied to one end of said piston by one transmission means and to the other end of said pistons by the other said transmission means.

3. A vehicle suspension system as claimed in claim 1 and wherein said regulating means is provided for each set of liquid transmission means between diagonally opposite pairs of dampers, said regulating means having a cylinder, a piston slidable therein, springs operating on both faces of said piston, connections between the liquid transmission means and both ends of said cylinder, an adjustable point for controlling the outflow of liquid from each end of said cylinder, and valves associated with the liquid transmission means extending in one direction from each end of the cylinder which valves serve to damp a liquid flow in one direction.

4. A vehicle suspension system as claimed in claim 1 and wherein regulating means is provided for each set of liquid transmission means between diagonally opposite pairs of dampers, said regulating means having a cylinder, a piston slidable therein, springs operating on both faces of said piston, connections between the liquid transmission means and both ends of said cylinder, pointed pins for controlling the flow of liquid from each end of said cylinder, means for adjusting said pins from a distance and valves associated with the liquid transmission means extending in one direction from each end of the cylinder which valves serve to damp a liquid flow in one direction.

EDMOND LOMBARD.